United States Patent Office 2,779,704
Patented Jan. 29, 1957

2,779,704

N-PHENYL MALEAMIC ESTERS

Waldo B. Ligett, Pontiac, Calvin N. Wolf, Ferndale, and Rex D. Closson, Detroit, Mich., assignors to Ethyl Corporation, New York, N. Y., a corporation of Delaware No Drawing. Application November 8, 1951,
Serial No. 255,536

10 Claims. (Cl. 167—30)

This invention relates to novel maleamic esters. In particular our invention relates to the alkyl esters of maleamic acid wherein the amide nitrogen contains a substituted-phenyl radical, thereby providing a class of compounds possessing unusual fungitoxic properties. Our invention also relates to methods of formulating such compounds into useful fungicides and methods for their application.

Various maleamic acids have been produced and disclosed in the prior art wherein the nitrogen of the amide group has been substituted with a variety of organic radicals and wherein various inorganic radicals have replaced one or more of the hydrogen atoms of the unsaturated linkage. Various acid derivatives such as, for example, the metal salts and the organic salts have likewise been prepared in this series. However, these acid derivatives do not possess inherent toxicity to fungus organisms, although certain of such materials have shown limited utility in the general field of pesticidal activity.

It is an object of our invention, therefore, to provide derivatives of maleamic acids which have high utility in the protection of a wide variety of materials from fungus attack. It is a further object of our invention to provide a class of materials which provide protection against a diversity of fungus organisms. It is also an object of our invention to provide a novel class of chemical compounds.

The compounds of our invention comprise the N-substituted-phenyl maleamic acid esters which can be illustrated by the following general formula:

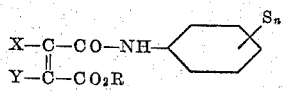

We have made the discovery that by esterifying the carboxylic acid group of N-substituted phenyl maleamic acids we can provide the property of fungitoxicants to this otherwise relatively ineffective chemical class. This result is entirely unexpected as it is the usual observation in the field of agricultural chemicals that where an active grouping includes a carboxylic acid radical, a wide variety of acid derivatives can be employed without materially changing or affecting the properties of such materials towards susceptible organisms. Our discovery is more surprising in view of the fact that the free acids or salts thereof possess a wider range of solubilities in aqueous solvents than the esters of our invention. However, we have found that in an aqueous system our esters are effective whereas the acids and salt-like derivatives of the acids are of limited effectiveness.

In the above general formula for the compounds of our invention we obtain the effective characteristics of our novel fungitoxicants when the group R is alkyl, or a derivative thereof such as, for example, aralkyl, alkenyl and various substitution products thereof, for example, the halogen-, sulfur-, or nitrogen-substituted derivatives. In a preferred embodiment of our invention we employ the lower alkyl esters, such as the methyl, ethyl, propyl, isopropyl, n-butyl, sec.-butyl, ter.-butyl, isobutyl, amyls and up to about the octyl esters.

We have found our novel class of compounds retain and in some instances exhibit enhanced activity when the X and Y of the above general formula are the same or different and are chosen from hydrogen, the halogens, sulfhydryl, amino, substituted amino, nitro and nitroso radicals.

The N-phenyl group of our novel fungitoxicants is substituted with the group $S_n$ in the above presentation of the formula, wherein $n$ is a small whole number from one to five inclusive and S is an organic radical or a negative group. Typical organic radicals, S, include alkyl, aralkyl, alkenyl, aryl or alkaryl radicals. Typical negative groups, S, include halogens, sulfur-, nitrogen- or oxygen-containing groups. As halogens we prefer to employ chlorine or bromine. Among the sulfur-containing groups we can employ sulfhydryl, trichloromethylthio, and the like. Oxygen-containing groups, S, comprise hydroxy, alkoxy, aryloxy, etc. Among the nitrogen-containing groups we prefer to employ amino, alkyl and aryl substituted amino, nitro, nitroso, amino-methylene groups and the like. When $n$ is greater than one, the phenyl substituents need not be the same, but can be chosen from a variety of radicals as above. Thus, we have found that considerable activity is exhibited by our fungitoxicants wherein the phenyl radical is substituted for example with one or more chlorine, amino, nitro or alkyl groups, or combinations thereof.

The choice of the various substituents X, Y, R and S depends largely on the type of material being protected by our fungitoxicants, the method of application which is selected and to a lesser degree the particular fungus organisms against which protection is sought. For example, such considerations as solubility, volatility, phytotoxicity, animal toxicity, compatibility with inert carriers, weathering characteristics, staining characteristics of the active ingredient, as well as similar properties of the compositions in which these materials are formulated, and in addition the pour point, fluidity, appearance, etc., all must be considered in choosing a fungicide for commercial application. Thus, provided with the fungitoxic grouping which we have discovered as in the above general formula it is possible to tailor our basic structure to provide a variety of fungitoxicants, each of which has merit for some combination of properties or level of toxicity and is particularly suited to solve the problem at hand.

The following examples of specific embodiments of the compounds of our invention serve to illustrate methods which we employ for manufacturing our materials and will indicate the chemical and physical properties of our novel class of compounds. However, we do not intend that our invention be limited by the specific illustrations herein as other embodiments are clearly within the scope of our invention and other methods for their manufacture will be apparent to those skilled in the art. In the examples which follow all parts and percentages are by weight.

EXAMPLE I

*Methyl ester of N-(p-chlorophenyl) maleamic acid.—*
N-(p-chlorophenyl) maleamic acid was prepared by adding a solution of 134 parts of p-chloroaniline in 400 parts of benzene into a stirred solution of 98 parts of maleic anhydride in 160 parts of benzene at a temperature of 20 to 25° C. Reaction occurred immediately, and the product separated as a copious yellow solid. After continuing the stirring for an additional period of 10 to 15 minutes, the product was collected by filtration and dried. The yield of yellow crystals was 220 parts, corresponding to a yield of 94 percent. This product melted at 191–192° C. In a reaction vessel equipped with a reflux condenser was placed 100 parts of this N-(p-chlorophenyl) maleamic acid, 500 parts of methanol, and 10 parts of p-toluenesulfonic acid monohydrate. This mixture was boiled under reflux for a period of 20 hours after which period 250 parts of methanol was removed by distillation. The resulting concentrate was cooled to a temperature of about 25° C. and added to 1,000 parts of a 5 percent aqueous sodium bicarbonate solution. After stirring for 10 minutes, the solid product was collected by filtration, washed with water, and dried. The yield of crude product was 71.5 parts, corresponding to a yield of 68 percent. Recrystallization from methanol gave white crystals, melting at 101 to 102° C. This material contained 14.8 percent chlorine, while the formula $C_{11}H_{10}O_3NCl$ requires 14.8 percent chlorine.

The corresponding propyl, n-butyl, isobutyl and n-amyl esters are prepared by substituting for the methanol of the esterification step of Example I propanol, n-butyl alcohol, isobutanol and n-amyl alcohol, respectively.

EXAMPLE II

*Methyl ester of N-(o-diphenyl) maleamic acid.*—N-(o-diphenyl) maleamic acid was prepared by adding a solution of 57 parts of maleic anhydride in 320 parts of benzene to a stirred reaction vessel and thereupon adding with the agitator in operation 100 parts of o-aminodiphenyl over a period of four minutes. Reaction occurred immediately with the separation of a copious yellow solid which was recovered by filtration and washed on the filter with additional benzene. This acid was 150 parts corresponding to a yield of 95.5 percent and had a melting point of 166 to 166.5° C. By analysis it was determined that this material contained 72.1 percent carbon, 5.1 percent hydrogen and 5.9 percent nitrogen, corresponding to the theoretical amount required for the formula $C_{16}H_{13}O_3N$ of 71.9 percent carbon, 4.9 percent hydrogen and 5.2 percent nitrogen. This acid product in the amount of 130 parts was treated in a reaction vessel equipped with a reflux condenser with 480 parts of methyl alcohol and 9 parts of p-toluenesulfonic acid monohydrate. This mixture was heated under reflux for 20 hours at the end of which period one-half of the methanol was removed by distillation. The resulting concentrate was poured with stirring into 500 parts of a 5 percent sodium bicarbonate solution whereupon a solid was precipitated which was recovered by filtration, washed with water and dried. This methyl ester was 119.5 parts corresponding to a yield of 86 percent based upon the free acid employed. Upon recrystallization from methanol a pure product was obtained melting at 137 to 138° C.

By following the procedure of the esterification step as in Example II, the butyl, isopropyl and amyl esters of N-(o-diphenyl) maleamic acid were likewise prepared in good yield.

EXAMPLE III

*Methyl ester of N-(p-diphenyl) maleamic acid.*—In a process similar to Example II above wherein the o-aminodiphenyl was replaced by 100 parts of p-aminodiphenyl, N-(p-diphenyl) maleamic acid was prepared in a yield corresponding to 95.5 percent. This material was isolated in the form of yellow crystals melting at 221 to 223° C. and contained 4.7 percent nitrogen, while the formula $C_{16}H_{13}O_3N$ required 5.2 percent nitrogen. This acid was esterified according to the procedure of Example II to provide a methyl ester melting at 114 to 115° C. This material by analysis was found to contain 72.8 percent carbon, 5.7 percent hydrogen and 4.8 percent nitrogen while the formula $C_{17}H_{15}O_3N$ requires 72.6 percent carbon, 5.4 percent hydrogen and 5.0 percent nitrogen.

EXAMPLE IV

*Methyl ester of N-(p-acetophenyl) maleamic acid.*—This ester was prepared according to the procedure of Example II from the acid resulting by treating p-acetoaniline with maleic anhydride. The purified ester melted at 135 to 135.7° C. and contained 5.35 percent nitrogen, while the formula $C_{13}H_{13}O_4N$ requires 5.66 percent.

Similarly by treating p-cyanoaniline and 2,5-dichloroaniline with maleic anhydride, the acids N-(p-cyanophenyl) maleamic acid and N-(2,5-dichlorophenyl) maleamic acid were prepared. The resulting methyl esters melted at 115.5 to 116.5° C. and 117.3 to 117.9° C. respectively.

EXAMPLE V

*Methyl ester of N-(p-nitrophenyl)-α-methyl-maleamic acid.*—Following the dual procedure of Example II the methyl ester of N-(p-nitrophenyl)-α-methyl maleamic acid was prepared from p-nitroaniline and citraconic anhydride followed by esterification in the presence of p-toluenesulfonic acid monohydrate. This ester melted at 144 to 145° C. after crystallization from methanol.

EXAMPLE VI

*Methyl ester of N-(p-nitrophenyl)-α-chloro-maleamic acid.*—N-(p-nitrophenyl)-α-chloro-maleamic acid was prepared according to the procedure of Example II by treating p-nitroaniline with α-chloro-maleic anhydride. Upon esterification of this acid with methanol in the presence of p-toluenesulfonic acid monohydrate, the methyl ester was recovered in 95 percent yield and on recrystallization this ester melted at 170 to 171° C. and contained 12.0 percent chlorine while the formula $C_{11}H_9O_5N_2Cl$ requires 12.5 percent chlorine.

By replacing the methanol in the esterification step with isopropyl alcohol, n-propanol and ethanol, the corresponding esters were produced in good yield.

EXAMPLE VII

*Butyl ester of N-(2,5-dichlorophenyl)-α-chloro-maleamic acid.*—By treating 97 parts of 2,5-dichloroaniline in 160 parts of benzene with 80 parts of α-chloromaleic anhydride in 160 parts of benzene at a temperature of about 25° C. in a stirred reaction vessel, a yellow solid separated, melting at 134 to 136° C. and corresponding to an 85 percent yield of N-(2,5-dichlorophenyl)-α-chloro-maleamic acid. A solution of the sodium salt of this acid was prepared by treating the acid with a dilute aqueous solution of sodium hydroxide. This solution, at a temperature from 0 to 5° C., was added to a solution of silver nitrate in water. Upon precipitation of the silver salt it was recovered by filtration, washed with cold water and with ethyl alcohol and then dried. The dry silver salt was suspended in anhydrous ether and N-butyl iodide was added thereto with stirring over a period of 15 minutes. After removing the precipitated silver iodide by filtration, the ether solution was extracted with 5 percent aqueous sodium bicarbonate and then with water. The ether and excess butyl iodide were removed by distillation and the residual product was recrystallized from ether to provide the n-butyl ester of N-(2,5-dichlorophenyl) maleamic acid.

Esters of other maleamic acids of our invention can be prepared in accordance with our invention. For example, by the foregoing processes we can prepare esters of β-chloro-N-(o-tolyl) maleamic acid, α-chloro-N-(p-aminophenyl) maleamic acid, α,β-dibromo-N-(p-diphenyl) maleamic acid, α-amino-N-(o-diphenyl) maleamic acid, α-(N,N-dimethylamino)-N - (p - nitrophenyl) maleamic acid, α-sulfhydryl-N-(p-chlorophenyl) maleamic acid, α-nitroso - β - chloro - N - (o - trichloromethylthiophenyl) maleamic acid, α-nitro-N-(m-ethylphenyl) maleamic acid, N-(2,4,5-trichlorophenyl) maleamic acid, α-chloro-N-(2-nitro-4-hydroxyphenyl) maleamic acid, α,β-dichloro-N-(p-bromophenyl) maleamic acid, α-sulfhydryl-N-(2-ethylphenyl) maleamic acid and N-(p-diphenyl) citraconamic acid. Many other variations of the compounds of our invention will be apparent to those skilled in the art.

The compounds of our invention can be employed as fungicides and for the prevention of the germination of the spores of fungi. One method of applying our fungicides is in the form of a water suspension, wherein a surface active agent has been incorporated in sufficient amount to disperse and suspend the fungicide. Examples of such surface active agents which can be employed in forming dispersions include salts of the alkyl and alkylaryl sulfonates, such as Du Pont MP–189 and Nacconol-NR, alkyl sulfates, such as Dreft, alkylamide sulfonates, such as Igepon-T, the alkyl-aryl polyether alcohols, such as Triton X–100, the fatty acid esters of polyhydric alcohols, such as Span, the ethylene oxide addition products of such esters, as for example Tween, and the addition products of long-chain mercaptans and ethylene oxide, such as Sharples' Non-Ionic–218. Still other surface active agents can be employed, the above merely showing a representative list of the more common materials.

The solubility of our novel maleamic acid esters in organic solvents, furthermore, is such that they can be applied advantageously in the form of solutions in this type of solvent, and for certain applications this method of application is preferred. For example, in treating cloth, leather or other fibrous articles it may be desirable to apply our fungicides dissolved in a volatile solvent. After use the volatile solvent evaporates leaving the fungicide impregnated throughout the surface of the article. Likewise, in applying our fungicides to smooth surfaces, as for example in treating wood surfaces for protection against fungus attack, a solution may be the most practical method for applying a protective film by brushing, spraying or dipping. The choice of an appropriate solvent is determined largely by the concentration of active ingredient which it is desired to employ, by the volatility required in a solvent, the spreading or flow characteristics thereof, and by the nature of the material being treated. Among the many organic solvents which can be employed as the carrier for our fungicides we can employ hydrocarbons, such as benzene or toluene; ketones, such as acetone and methylethyl ketone; chlorinated solvents, such as carbon tetrachloride, trichloro- and perchloro-ethylene; and esters, such as ethyl, butyl and amyl acetates; and alcohols, such as ethanol, isopropanol, and amyl alcohols. Among the solvents which we prefer to employ are the carbitols and Cellosolves, the former comprising in general the monoalkyl ethers of diethylene glycol and the latter the monoalkyl ethers of ethylene glycol. In addition, combinations of these various typical solvents can be employed whereby special volatility and viscosity characteristics can be imparted to our formulations.

In addition to the above-described methods of wet application of the esters of N-(substituted-phenyl) maleamic acid we can prepare compositions in which our materials are extended in talc, clay or other solid diluents. Such formulations have particular utility in the treatment of seeds, wherein an aqueous application may promote premature germination, or where a solvent application may damage the seed. For certain field crop applications we also prefer a dust formulation wherein a wet application might introduce certain secondary effects which are undesirable. Further specific examples of such typical inert solid carriers which can be employed as diluents in our dust formulations include fuller's earth, pyrophyllite, Attaclay and the Filtrols.

To demonstrate the utility of our maleamic esters as fungicides we determined the concentration at which the germination of 50 percent of the spores of each of the fungi *Alternaria oleracea* and *Sclerotinia fructicola* is inhibited. The former is responsible for the potato blight, while the latter causes peach rot. These fungi are representative of fungus types which are responsible for heavy crop damage. The ability to control these fungi is a reliable indication of the general applicability of our fungicides to protect important agricultural crops. These tests were conducted as follows: 100 parts of the active ingredient was triturated with 1,000 parts of distilled water containing one part of the commercial dispersant Triton X–100. This standard suspension was thereupon further diluted with distilled water and the concentration at which one-half of the fungi contained in a drop of water on a microscope slide were prevented from sporulating was determined. This standard slide-germination method is described and accepted by the Committee on Standardization of Fungicidal Tests of the American Phytopathological Society in "Phytopathology," 33, 627 (1943). In the following table are listed typical results of these determinations wherein the methyl esters of typical maleamic acids of our invention were employed.

Table

| Methyl ester of— | Minimum Concentration (p. p. m.) to inhibit sporulation 50 percent | |
| --- | --- | --- |
|  | A. oleracea | S. fructicola |
| N-(p-Chlorophenyl) maleamic acid | 0.1 | 0.1 |
| N-(p-Nitrophenyl) maleamic acid | 0.5 | 1.0 |
| N-(o-Diphenyl) maleamic acid | 0.1 | 0.01 |
| N-(p-Nitrophenyl)-α-methyl maleamic acid | 10 | 10 |
| N-(p-Nitrophenyl)-α-chloro maleamic acid | 1.0 | 1.0 |

Equally good results are obtained when other esters, such as, for example, the ethyl, propyl, butyl, hexyl and the like are employed in the above determinations. Comparing results as listed in the table with similar determinations on the free acids or salts, we found the esters to be effective at from one hundredth to one ten thousandth the concentrations required of such acids or salts.

Of particular importance in the treatment of agricultural crops against fungus diseases is the susceptibility of the plant to damage by the fungitoxicant employed. Our materials are particularly advantageous in this respect since in a variety of tests we have found no evidence that our materials are toxic to plants or inhibit in any way the normal functioning of the plant or the germination of seeds. We have demonstrated the innocuous nature of our fungitoxicants by dipping the entire leaf of each of corn, soybean, tomato, cucumber and cotton plants in suspensions of our fungicides at concentrations as high as 10,000 p. p. m. and have observed no effect on the so-treated plants or upon the leafs which were dipped. Furthermore, each of these plants was totally sprayed with dispersions of our fungicides in water at a concentration of 10,000 p. p. m. without any effect on the plant. Even when our fungicides are applied as a lanolin paste to the stem of young plants of the above species no adverse effects were noted.

The effectiveness of our fungicides in protecting growing plants from fungus diseases has been demonstrated by control of both tomato early blight and tomato late blight. For this purpose a number of young tomato plants were selected. One-third of the plants were sprayed with a 0.2 percent aqueous suspension of typical fungicides of our invention, one-third were sprayed in a like manner with a 0.2 percent aqueous suspension of the commercial fungicide, zinc dimethyl dithiocarbamate and one-third were left as controls. Each group was then infected uniformly with the fungus organisms responsible for each disease. At the termination of the demonstration, after the full effect of the fungus had been produced, the plants sprayed with such typical examples of our fungitoxicants as the methyl esters of N-(p-nitrophenyl) maleamic acid, N-(o-diphenyl) maleamic acid, N-(p-diphenyl) maleamic acid, N-(p-nitrophenyl)-α-methyl maleamic acid, N-(p-nitrophenyl)-α-chloro maleamic acid, and the like were protected from developing lesions to degrees ranging from 75 to 100 percent compared with the controls. Thus, essentially complete control of tomato early blight was obtained by our materials.

Having described various embodiments of the novel compounds of our invention and pointed out the utility to which they may be applied we do not intend that our invention should be limited to the above specific examples of our compounds or methods of their application or use except as in the appended claims.

We claim:
1. Lower alkyl esters of N-nitrophenyl maleamic acid.
2. Methyl ester of N-(p-nitrophenyl) maleamic acid.
3. Fungicidal compositions having as the principal active ingredient material having the general formula

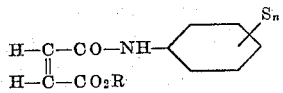

wherein R is a lower alkyl radical, $n$ is a small whole number from 1 to 5 inclusive, and S is selected from the group consisting of aryl, halogen, acyl and nitro groups, and a relatively inert fungicidal adjuvant as a carrier therefor.

4. A method of combatting fungi which comprises treating materials susceptible of attack by fungus organisms with the material having the general formula

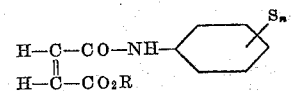

wherein R is a lower alkyl radical, $n$ is a small whole number from 1 to 5 inclusive, and S is selected from the group consisting of aryl, halogen, acyl and nitro groups.

5. Fungicidal compositions comprising lower alkyl esters of N-nitrophenyl maleamic acid, an inert fungicidal adjuvant as a carrier therefor and a surface-active agent.

6. Fungicidal compositions comprising lower alkyl esters of N-chlorophenyl maleamic acid and an inert fungicidal adjuvant as a carrier therefor.

7. Fungicidal compositions comprising lower alkyl esters of N-diphenyl maleamic acid and an inert fungicidal adjuvant as a carrier therefor.

8. A method of combatting fungi which comprises treating materials susceptible of attack by fungus organisms with a composition consisting of lower alkyl esters of N-nitrophenyl maleamic acid, an inert fungicidal adjuvant as a carrier therefor and a surface-active agent.

9. A method of combatting fungi which comprises treating materials susceptible of attack by fungus organisms with a composition consisting of lower alkyl esters of N-chlorophenyl maleamic acid.

10. A method of combatting fungi which comprises treating materials susceptible of attack by fungus organisms with a composition consisting of lower alkyl esters of N-diphenyl maleamic acid.

References Cited in the file of this patent

Anschutz: Liebig's Annalen, 461, 168 and 186 (1928).
Bergmann et al.: J. Organic Chem. 7 (1942), 419–23.
Carrona: Gazz. Chim. Ital. 78, 38–43 (1948).